US012280385B2

(12) United States Patent
Tong

(10) Patent No.: US 12,280,385 B2
(45) Date of Patent: Apr. 22, 2025

(54) LIQUID-FILLABLE SPRAY HEAD

(71) Applicant: Yiwu Yujin Glass Products Co., Ltd., Jinhua (CN)

(72) Inventor: Xueying Tong, Jinhua (CN)

(73) Assignee: Yiwu Yujin Glass Products Co., Ltd., Jinhua (CN)

( * ) Notice: Subject to any disclaimer, the term of this patent is extended or adjusted under 35 U.S.C. 154(b) by 0 days.

(21) Appl. No.: 18/969,098

(22) Filed: Dec. 4, 2024

(65) Prior Publication Data

US 2025/0091071 A1 Mar. 20, 2025

Related U.S. Application Data

(63) Continuation of application No. PCT/CN2024/095444, filed on May 27, 2024.

(30) Foreign Application Priority Data

Jul. 25, 2023 (CN) ......................... 202321976017.1

(51) Int. Cl.
*B05B 11/00* (2023.01)
*B05B 11/10* (2023.01)

(52) U.S. Cl.
CPC ...... *B05B 11/1047* (2023.01); *B05B 11/1001* (2023.01)

(58) Field of Classification Search
CPC ............. B05B 11/1047; B05B 11/1001; B05B 11/0056; B05B 11/1087; B65D 83/42; B67D 7/06
USPC .......................................................... 222/401
See application file for complete search history.

(56) References Cited

U.S. PATENT DOCUMENTS

| | | | | |
|---|---|---|---|---|
| 3,357,603 | A * | 12/1967 | Kitabayashi | B65D 83/42 222/402.16 |
| 9,365,408 | B2 * | 6/2016 | Tu | B67D 7/06 |
| 9,522,403 | B2 * | 12/2016 | Hui | B05B 11/0097 |
| 10,246,249 | B2 * | 4/2019 | Hui | B65D 83/42 |
| 11,814,238 | B2 * | 11/2023 | Zheng | B05B 11/0038 |
| 2012/0090730 | A1 | 4/2012 | Dumont | |
| 2013/0126639 | A1 | 5/2013 | Tu | |
| 2014/0190583 | A1 | 7/2014 | Pu | |

FOREIGN PATENT DOCUMENTS

| | | | |
|---|---|---|---|
| CN | 201055827 | Y | 5/2008 |
| CN | 103213767 | A | 7/2013 |
| CN | 103231871 | A | 8/2013 |

(Continued)

*Primary Examiner* — Vishal Pancholi
(74) *Attorney, Agent, or Firm* — Andrew C. Cheng

(57) ABSTRACT

The present invention provides a liquid-fillable spray head, including: a spray head assembly, and a liquid-fillable seat detachably connected to a bottom of the spray head assembly; wherein a liquid channel and an air exhaust channel are arranged through the liquid-fillable seat; a liquid pipe is installed on the liquid channel and extends downwardly; an air exhaust pipe is installed on the air exhaust channel and extends downwardly; the liquid channel is in communication with an internal channel of the spray head assembly; a seal part is disposed between the spray head assembly and the liquid-fillable seat; when the spray head assembly is installed on the liquid-fillable seat, the spray head assembly seals the air exhaust channel.

7 Claims, 4 Drawing Sheets

(56) References Cited

FOREIGN PATENT DOCUMENTS

| | | | |
|---|---|---|---|
| CN | 103347618 | A | 10/2013 |
| CN | 203428253 | U | 2/2014 |
| CN | 205128249 | U | 4/2016 |
| CN | 206009063 | U | 3/2017 |
| CN | 207536441 | U | 6/2018 |
| CN | 209492872 | U | 10/2019 |
| CN | 111418989 | A | 7/2020 |
| CN | 215155873 | U | 12/2021 |
| CN | 220425655 | U | 2/2024 |
| EP | 2335833 | A1 | 6/2011 |

* cited by examiner

LIQUID-FILLABLE SPRAY HEAD

CROSS-REFERENCE TO RELATED APPLICATIONS

This application is a Bypass Continuation Application of PCT International Application No. PCT/CN2024/095444 filed on May 27, 2024, which claims the priority of Chinese Application No. 202321976017.1, filed on Jul. 25, 2023, the disclosures of which are incorporated in their entirety by reference herein.

FIELD OF THE DISCLOSURE

The invention relates to the field of liquid spray heads, specifically to a liquid-fillable spray head.

BACKGROUND

A container bottle refers to a bottle used to hold liquids such as water, make-up water, lotion, perfume. For convenience of liquid use, such bottle is equipped with a lotion pump, a head cap and other components at a bottle mouth of a bottle body to facilitate the liquid export. Taking a perfume bottle as an example, by pressing a head cap on a bottle mouth, perfume can be sprayed out in the form of mist. In order to facilitate refilling of the liquid into the bottle after the perfume and other liquids are used up, in the related art, a liquid filling valve port is additionally installed at a bottom of the bottle or a side of the bottle body, through which the liquid can be introduced into the bottle, so as to facilitate the reuse of the bottle body.

For example, the Chinese invention patent with the application No. 201310148551.8 discloses a liquid-refillable spray bottle, and the Chinese utility model patent with the application No. 201320246540.9 discloses a detachable liquid-refillable spray bottle, which can realize the reuse of the bottle body. However, the above solution and the liquid-fillable spray head solution in the related art require a specially designed bottle body structure due to the presence of a liquid-filling valve at the bottom or side of the bottle. When there is size error or poor matching problem with the liquid-filling valve, there is a high risk of leakage, low replaceability and compatibility, and high complexity in disassembly, cleaning and installation, which is very inconvenient.

SUMMARY

The present invention provides a liquid-fillable spray head, which can solve the problems of the existing liquid-refillable spray head solution proposed in the above background, which requires a specially designed bottle body, and has a high risk of leakage, low replaceability and compatibility, and high complexity in disassembly, cleaning and installation.

The technical solution of the present invention is realized as follows.

A liquid-fillable spray head includes: a spray head assembly, and a liquid-fillable seat detachably connected to a bottom of the spray head assembly; wherein a liquid channel and an air exhaust channel are arranged through the liquid-fillable seat; a liquid pipe is installed on the liquid channel and extends downwardly; an air exhaust pipe is installed on the air exhaust channel and extends downwardly; the liquid channel is in communication with an internal channel of the spray head assembly; a seal part is disposed between the spray head assembly and the liquid-fillable seat; when the spray head assembly is installed on the liquid-fillable seat, the spray head assembly seals the air exhaust channel.

Optionally, a bottle body is detachably connected to a bottom of the liquid-fillable seat; and the liquid pipe and the air exhaust pipe both extend to an inside of the bottle body.

Optionally, the air exhaust pipe extends in the inside of the bottle body to a position close to a bottle mouth, a middle part of the bottle body or a bottle bottom.

Optionally, the liquid channel is located at a center of the liquid-fillable seat.

Optionally, the seal part includes a first sealing ring installed below the spray head assembly; a downward projection of the sealing ring covers the air exhaust channel; after the spray head assembly is connected to the liquid-fillable seat, the sealing ring is pressed tightly to seal the air exhaust channel.

Optionally, the seal part further includes a second sealing ring installed above the liquid channel of the liquid-fillable seat; after the spray head assembly is connected to the liquid-fillable seat, the spray head assembly presses tightly the second sealing ring, so that the liquid channel is in communicated with the internal channel of the spray head assembly with a connection therebetween in a sealed state.

Optionally, the spray head assembly includes an outer shell, and an inner sleeve installed at an inner center of the outer shell; the outer shell is detachably connected to the liquid-fillable seat; a lower part of the inner sleeve has a downward protruding first protrusion; the first sealing ring is sleeved on an outer of the first protrusion; a lower part of the first protrusion has a downward protruding second protrusion; and a lower end surface of the second protrusion abuts against the second sealing ring.

Adopting the above technical solution, the beneficial effects of the present invention are as follows.

The liquid-fillable spray head provided by the present invention can be used for any refilling bottle, liquid-spraying bottle, perfume bottle, liquid bottle and any container with a bottle mouth. The assembly can be completed simply by installing the liquid-fillable spray head at the bottle mouth of the bottle body, which has advantages of convenient disassembly and assembly, and can achieve liquid-filling effect without a specially designed bottle body structure, and has characteristics of high replaceability and compatibility, high stability and capable of avoiding liquid leakage.

BRIEF DESCRIPTION OF THE DRAWINGS

In order to explain the embodiments of the present invention or the technical solutions in the related art more clearly, the drawings needed to be used in the description of the embodiments or the related art will be briefly introduced hereinafter. Obviously, the drawings in the following description are only some embodiments of the present invention. For those of ordinary skill in the art, other drawings can be obtained based on these drawings without exerting any creative effort.

In the drawing.

Figure 1:
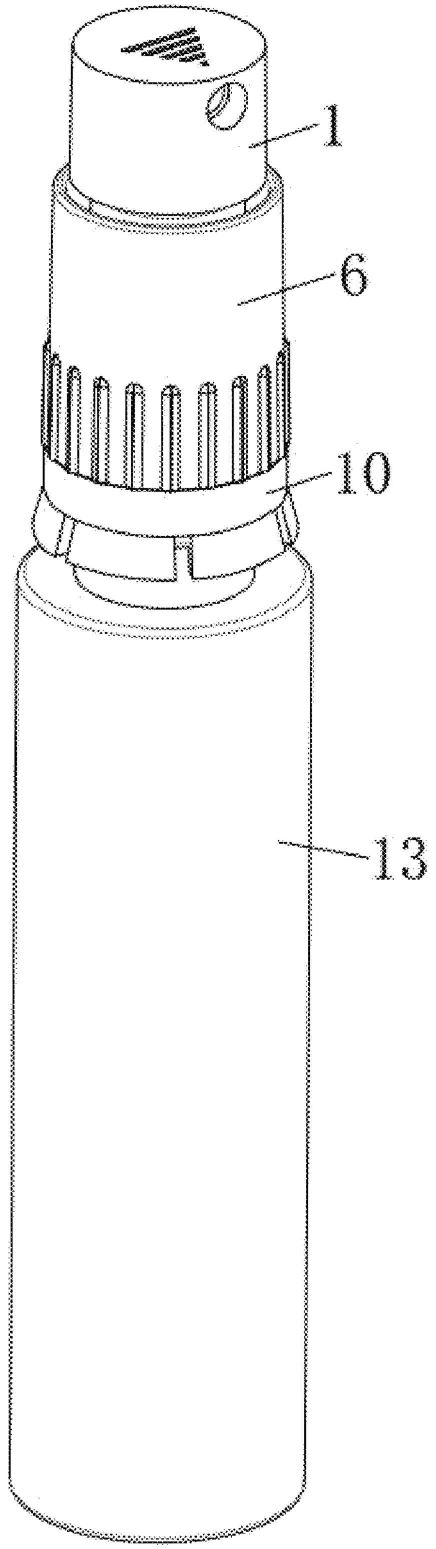
FIG. 1 is a perspective view of the present invention.
Figure 2:
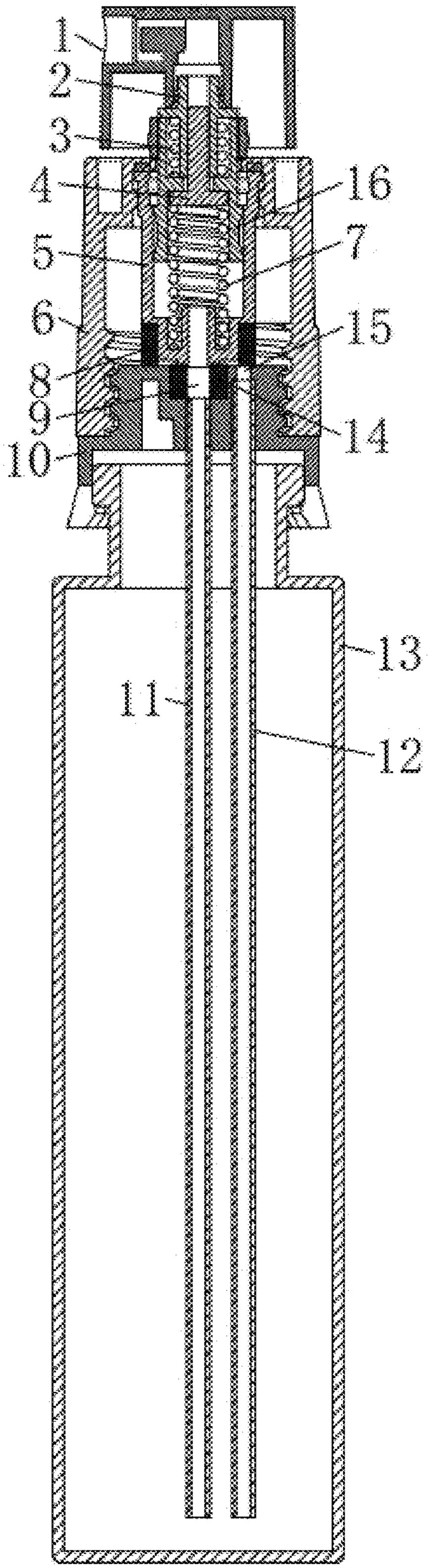
FIG. 2 is a cross-sectional view of the present invention.
Figure 3:
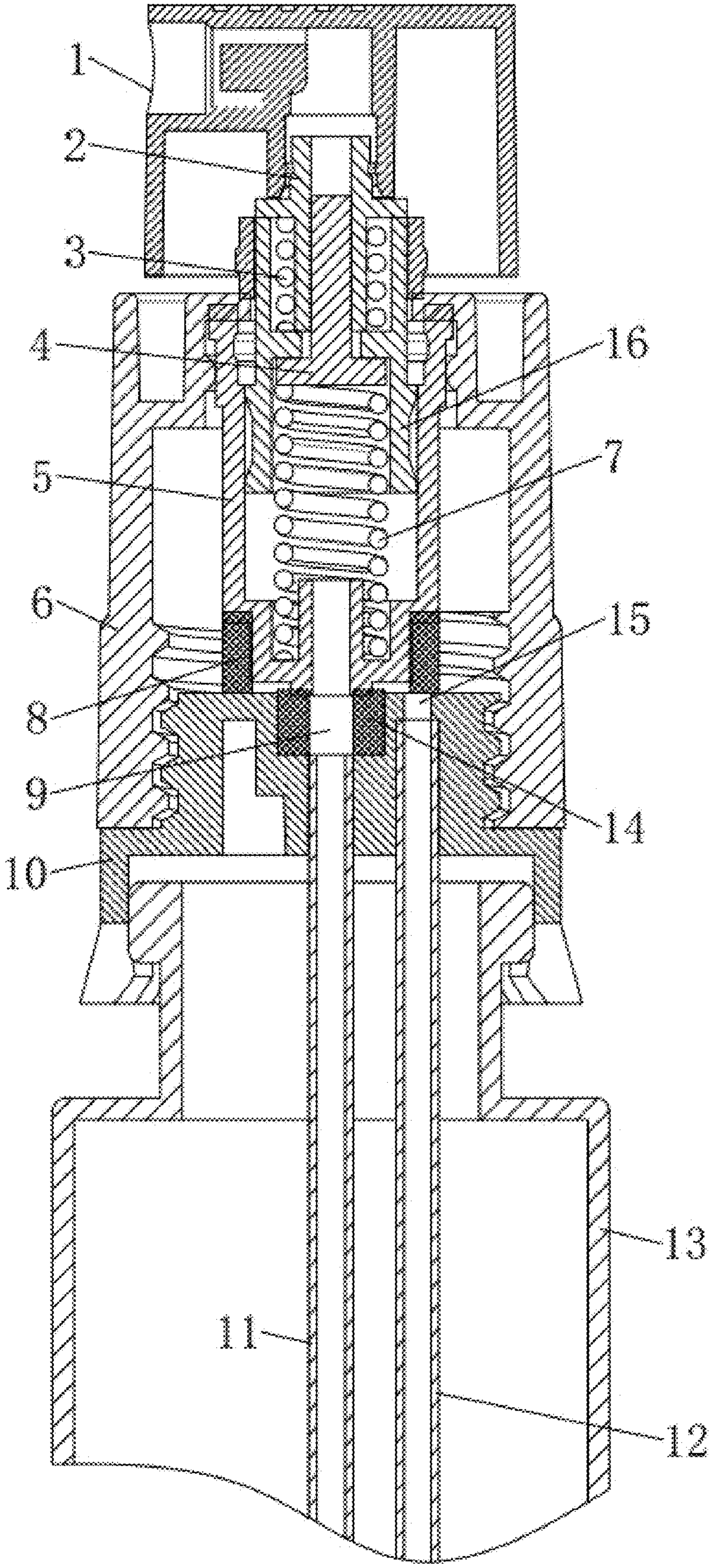
FIG. 3 is a partial enlarged view of FIG. 2 of the present invention.
Figure 4:
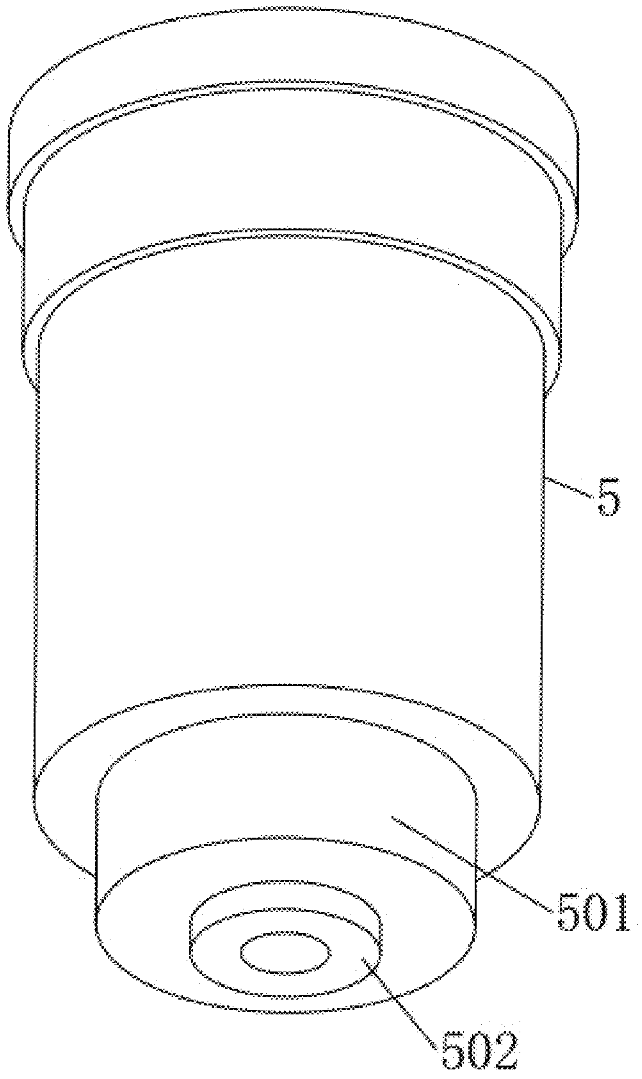
FIG. 4 is a perspective view of an inner sleeve of the present invention.

1. button; 2. nozzle; 3. first spring 1; 4. valve needle; 5. inner sleeve; 501. first protrusion; 502. second protrusion; 6. outer shell; 7. second spring; 8. first seal ring;

9. liquid channel; 10. liquid-fillable seat; 11. liquid pipe; 12. air exhaust pipe; 13. bottle body; 14. second seal ring; 15. air exhaust channel; 16. piston.

DETAILED DESCRIPTION OF PREFERRED EMBODIMENTS

The technical solutions in the embodiments of the present invention will be clearly and completely described hereinafter with reference to the accompanying drawings in the embodiments of the present invention. Obviously, the described embodiments are only part of the embodiments of the present invention, rather than all embodiments. Based on the embodiments of the present invention, all other embodiments obtained by those of ordinary skill in the art without making creative efforts fall within the protection scope of the present invention.

As shown in the figures, a liquid-fillable spray head includes a spray head assembly, and a liquid-fillable seat 10 detachably connected to a bottom of the spray head assembly. The internal principle structure of the spray head assembly belongs to the conventional configuration of the related art, that is, the liquid in a bottle body 13 is exported outward by pressing, and the liquid can be emulsion liquid or non-emulsion liquid, and the liquid can be exported in spray or non-spray form. The spray head assembly includes an outer shell 6, and an inner sleeve 5 installed at an inner center of the outer shell 6. The inner sleeve 5 is clamped in the middle of the outer shell 6. The difference is that the outer shell 6 is detachably connected to the liquid-fillable seat 10. In this example, the outer shell 6 and the liquid-fillable seat 10 are connected by a threaded connection, or they can also be detachably connected in other ways, which is not limited here. A lower part of the inner sleeve 5 has a downward protruding first protrusion 501. A lower part of the first protrusion 501 has a downward protruding second protrusion 502.

More specifically, in this example, the spray head assembly further includes a piston 16 installed in the center of the inner sleeve 5. The piston 16 is in sealing and sliding engagement with the inner sleeve 5. A valve needle 4 with an inverted T-shaped cross-section is disposed in the piston 16. A second spring 7 is installed between a lower surface of valve needle 4 and an inner bottom of the inner sleeve 5. A nozzle 2 is installed at an upper position inside the piston 16. The nozzle 2 is sleeved outside the valve needle 4. A first spring 3 is disposed outside the nozzle 2. A button 1 is installed above the nozzle 2. The button 1 and the nozzle 2 are connected and synchronously moved in an axial direction. When the button 1 is pressed down, the nozzle 2, the valve needle 4 and the piston 16 can be driven downward and the second spring 7 is compressed, so that a volume of a space formed between the inner sleeve 5 and the piston 16 decreases. When the button 1 is released, the nozzle 2, the valve needle 4 and the piston 16 move upward under the elastic force of the second spring 7, and a volume of the space formed between the inner sleeve 5 and the piston 16 increases, and then the pressure decreases, thereby transferring the liquid in the bottle body 13 to the space between the piston 16 and the inner sleeve 5 through a liquid pipe 11. When the button 1 is continued to be pressed, the volume between the piston 16 and the inner sleeve 5 gradually decreases, which enables the liquid to flow upward through a gap between the valve needle 4 and the piston 16, and be finally discharged outward from an internal channel of the button 1, thereby completing an entire discharge process of the liquid.

A liquid channel 9 and an air exhaust channel 15 are arranged through the liquid-fillable seat 10. The liquid pipe 11 is installed on the liquid channel 9 and extends downwardly. An air exhaust pipe 12 is installed on the air exhaust channel 15 and extends downwardly. The liquid channel 9 is in communication with an internal channel of the spray head assembly. There is a seal part between the spray head assembly and the liquid-fillable seat 10. When the spray head assembly is installed on the liquid-fillable seat 10, the spray head assembly can seal the air exhaust channel 15.

The seal part includes a first sealing ring 8 installed below the spray head assembly. Specifically, the first sealing ring 8 is sleeved on an outer wall of the first protrusion 501. A downward projection of the sealing ring 8 can cover the air exhaust channel 15. After the spray head assembly is connected to the liquid-fillable seat 10, the sealing ring 8 is pressed tightly to seal the air exhaust channel 15, so that when the container bottle is used normally, the air exhaust channel 15 is in a closed state, which can avoid the problem of liquid leakage.

The seal part further includes a second sealing ring 14 installed above the liquid channel 9 of the liquid-fillable seat 10. After the spray head assembly is connected to the liquid-fillable seat 10, the spray head assembly can press tightly the second sealing ring 14, so that the liquid channel 9 is in communicated with the internal channel of the spray head assembly with a connection therebetween in a sealed state. Specifically, a lower end surface of the second protrusion 502 protruding from the lower part of the inner sleeve 5 can abut against an upper surface of the first sealing ring 8 and press the first sealing ring 8, so that when the liquid channel 9 of the liquid-fillable seat 10 is in communication with the internal channel of the spray head assembly, the connection therebetwen is in a sealed state, thereby avoiding the problem of liquid leakage.

Specifically, a bottle body 13 is detachably connected to the bottom of the liquid-fillable seat 10. The connection mode between the liquid-fillable seat 10 and the bottle body 13 can be a lock shell, engaged tooth and grooves, jaw press, buckle, threaded connection, etc. In this way, when the liquid-fillable seat 10 is installed on the bottle body 13, it can be firmly connected and a connection part therebetwen is in a sealed state to avoid liquid leakage. The liquid pipe 11 and the air exhaust pipe 12 both extend to an inside of the bottle body 13.

Specifically, the air exhaust pipe 12 extends in the inside of the bottle body 13 to a position close to a bottle mouth, a middle part of the bottle body 13 or a bottle bottom. Such arrangement is to meet different liquid-filling modes, that is, when the air exhaust pipe 12 extends to the bottom of the bottle, the bottle body 13 can be turned upside down and other perfume bottle can be used for filling liquid. When an end of the air exhaust pipe 12 is close to the bottle mouth or the bottle body 13, the bottle body 13 is upright, and filled with liquid by means of a syringe.

In this example, the liquid channel 9 is located at the center of the liquid-fillable seat 10, and is mainly used to match the spray head assembly with the channel located in the middle position. When the internal channel of the spray head assembly is not in the center, the liquid channel 9 may not be located at the center of the liquid-fillable seat 10.

The operation principle is as follows. When the liquid-fillable spray head is in use, its upper end is connected to the spray head assembly and its lower end is connected to the bottle body 13; when the button 1 of the spray head assembly is pressed, the liquid in the bottle body 13 can flow upward along the liquid pipe 11, and is finally exported through the internal channel of the spray head assembly. During this process, the air exhaust channel 15 is in a closed state, which can avoid liquid leakage problems. When it is necessary to replenish liquid, the spray head assembly can be disassembled, and other container bottle is aligned with a channel of the liquid channel 9 to replenish fluid, or, the syringe can be used to replenish the liquid. During the process of replenishing the liquid, air in the bottle body 13 can be discharged from the air exhaust channel 15, thereby avoiding the problem that the pressure in the bottle is too large to replenish the liquid.

The above descriptions are only preferred embodiments of the present invention and are not intended to limit the present invention. Any modifications, equivalent substitutions, improvements, etc. made within the spirit and principles of the present invention shall be included in within the protection scope of this utility model.

What is claimed is:

1. A liquid-fillable spray head, comprising: a spray head assembly, and a liquid-fillable seat (10) detachably connected to a bottom of the spray head assembly; wherein a liquid channel (9) and an air exhaust channel (15) are arranged through the liquid-fillable seat (10); a liquid pipe (11) is installed on the liquid channel (9) and extends downwardly; an air exhaust pipe (12) is installed on the air exhaust channel (15) and extends downwardly; the liquid channel (9) is in communication with an internal channel of the spray head assembly; a seal part is disposed between the spray head assembly and the liquid-fillable seat (10); when the spray head assembly is installed on the liquid-fillable seat (10), the spray head assembly seals the air exhaust channel (15).

2. The liquid-fillable spray head according to claim 1, wherein a bottle body (13) is detachably connected to a bottom of the liquid-fillable seat (10); and the liquid pipe (11) and the air exhaust pipe (12) both extend to an inside of the bottle body (13).

3. The liquid-fillable spray head according to claim 2, wherein the air exhaust pipe (12) extends in the inside of the bottle body (13) to a position close to a bottle mouth, a middle part of the bottle body (13) or a bottle bottom.

4. The liquid-fillable spray head according to claim 1, wherein the liquid channel (9) is located at a center of the liquid-fillable seat (10).

5. The liquid-fillable spray head according to claim 1, wherein the seal part includes a first sealing ring (8) installed below the spray head assembly; a downward projection of the sealing ring (8) covers the air exhaust channel (15); after the spray head assembly is connected to the liquid-fillable seat (10), the sealing ring (8) is pressed tightly to seal the air exhaust channel (15).

6. The liquid-fillable spray head according to claim 5, wherein the seal part further includes a second sealing ring (14) installed above the liquid channel (9) of the liquid-fillable seat (10); after the spray head assembly is connected to the liquid-fillable seat (10), the spray head assembly presses tightly the second sealing ring (14), so that the liquid channel (9) is in communicated with the internal channel of the spray head assembly with a connection therebetween in a sealed state.

7. The liquid-fillable spray head according to claim 6, wherein the spray head assembly includes an outer shell (6), and an inner sleeve (5) installed at an inner center of the outer shell (6); the outer shell (6) is detachably connected to the liquid-fillable seat (10); a lower part of the inner sleeve (5) has a downward protruding first protrusion (501); the first sealing ring (8) is sleeved on an outer of the first protrusion (501); a lower part of the first protrusion (501) has a downward protruding second protrusion (502); and a lower end surface of the second protrusion (502) abuts against the second sealing ring (14).

* * * * *